(12) United States Patent
Cao et al.

(10) Patent No.: US 7,624,462 B2
(45) Date of Patent: Dec. 1, 2009

(54) LOAD BEARING OR CUSHIONING ELEMENTS AND METHOD OF MANUFACTURE

(75) Inventors: Bangshu Cao, Raleigh, NC (US); Eduardo Lauer, Zebulon, NC (US); Michael W. Allman, Wilson, NC (US)

(73) Assignee: Nomaco, Inc., Zebulon, NC (US)

( * ) Notice: Subject to any disclaimer, the term of this patent is extended or adjusted under 35 U.S.C. 154(b) by 312 days.

(21) Appl. No.: 11/449,436

(22) Filed: Jun. 7, 2006

(65) Prior Publication Data

US 2006/0290039 A1 Dec. 28, 2006

Related U.S. Application Data

(60) Provisional application No. 60/691,917, filed on Jun. 17, 2005.

(51) Int. Cl.
*A47C 27/14* (2006.01)
*F16F 1/37* (2006.01)

(52) U.S. Cl. .................... 5/655.9; 5/719; 5/740; 5/953; 267/145; 267/153

(58) Field of Classification Search .................. 5/655.9, 5/740, 953, 719, 247, 255; 267/143, 145, 267/153

See application file for complete search history.

(56) References Cited

U.S. PATENT DOCUMENTS

| | | | | |
|---|---|---|---|---|
| 1,980,445 A * | 11/1934 | Sherover | | 5/724 |
| 1,994,234 A * | 3/1935 | Sherover | | 5/724 |
| 3,633,228 A * | 1/1972 | Zysman | | 267/152 |
| 4,194,255 A * | 3/1980 | Poppe | | 267/153 |
| 5,027,458 A * | 7/1991 | Osczevski et al. | | 5/700 |
| 5,353,455 A * | 10/1994 | Loving et al. | | 5/730 |
| 5,746,419 A * | 5/1998 | McFadden et al. | | 267/140 |
| 5,749,111 A * | 5/1998 | Pearce | | 5/652 |
| 5,836,027 A | 11/1998 | Leventhal et al. | | 5/706 |
| 6,284,346 B1 * | 9/2001 | Sheridan | | 428/156 |
| 6,286,167 B1 | 9/2001 | Stolpmann | | 5/737 |
| 6,347,423 B1 | 2/2002 | Stumpf | | 5/720 |
| 6,612,556 B2 * | 9/2003 | Petrina | | 267/168 |
| 6,637,735 B2 * | 10/2003 | Monson et al. | | 267/141 |
| 6,704,962 B2 | 3/2004 | Choi | | 5/740 |
| 7,000,277 B2 * | 2/2006 | Torres Cervera | | 5/719 |
| 7,120,956 B1 * | 10/2006 | Liao | | 5/719 |
| 2003/0101517 A1 * | 6/2003 | Choi | | 5/740 |
| 2003/0110567 A1 * | 6/2003 | Kawamura et al. | | 5/655.9 |
| 2006/0290039 A1 * | 12/2006 | Cao et al. | | 267/153 |
| 2009/0100603 A1 * | 4/2009 | Poppe | | 5/655.9 |
| 2009/0183314 A1 * | 7/2009 | Demoss | | 5/716 |

FOREIGN PATENT DOCUMENTS

WO    WO 9522922 A1 *  8/1995

* cited by examiner

*Primary Examiner*—Robert G Santos
(74) *Attorney, Agent, or Firm*—Melvin I. Stoltz

(57) ABSTRACT

By providing an elongated profile which incorporates a plurality of indentations formed therein, a load bearing/cushioning/supporting element is realized. By employing this construction, the element accommodates large strain under force, and shows good resiliency and repeated recovery. The element can be produced from a continuous extrusion process with immediate manipulation to re-shape the extrusion profile, or secondary thermal forming process which follows the extrusion process, or blow molding process, or injection molding process.

29 Claims, 11 Drawing Sheets

Comparison of Single "Spring"

LOAD BEARING OR CUSHIONING ELEMENTS AND METHOD OF MANUFACTURE

RELATED APPLICATIONS

This application is related to U.S. Provisional Patent Application Ser. No. 60/691,917, filed Jun. 17, 2005 entitled FOAM, LOAD BEARING OR CUSHIONING ELEMENTS AND METHOD OF MANUFACTURE.

FIELD OF THE INVENTION

The present invention relates to load bearing, supporting, and/or cushioning elements and, more particularly, to load bearing, supporting and/or cushioning elements for use in supporting and/or resisting loads in various products.

BACKGROUND OF THE INVENTION

The creation of effective, easily produced, and competitively priced load bearing, supporting, and/or cushioning elements has long been sought in many different and diverse areas. In this regard, the need for load bearing, supporting, and/or cushioning elements is a requirement in many industries for use in many end products, as well as in transportation, product safety, and product protection. As a result, substantial effort has been expended in developing and improving existing products, with all of such efforts failing to achieve a single, universally applicable product which is capable of satisfying all of the needs and requirements of the various industries and end uses.

One area which typifies the inherent requirements imposed upon a viable product is the bedding and furniture industry. In this regard, mattresses, seats, cushions, upholstered products, and the like require load bearing, supporting, and/or cushioning elements to satisfy users by providing the comfort being sought from these products. Although the following discussion focuses upon this industry, the focus is provided as a single example of the numerous other industries in which load bearing, supporting, and/or cushioning elements of similar physical characteristics are required. One-example of such other industries is the packaging industry wherein load bearing, cushioning, and/or supporting elements are employed for protecting a wide variety of products from damage during shipment and delivery.

In regard to the mattress and furniture industry, most mattresses, seats, and upholstered items have universally employed coil spring members formed from metal as the principal element for providing support and comfort to individuals using the particular product. Although coil spring members formed from metal have been widely accepted as the principal element to provide the desired support for individuals in these products, substantial difficulties have been encountered in producing products incorporating coil springs.

In particular, substantial manual effort is typically required to produce products incorporating coil springs, due to the requirement that the spring members be interconnected with each other to achieve the desired overall support. In addition, the metal material employed, the coil configuration, its length, configuration, etc. must also be carefully controlled in order to assure that the coil spring assembly will provide the desired support and comfort to the user. In this regard, due to the personal nature and preference individuals have for a desirable level of support and comfort, particularly in mattresses, the industry has been required to introduce a wide variety of alternate configurations and constructions which surrounds the coil spring base, in order to provide various levels of support and comfort. This effort has necessitated the industry to incur substantial additional costs in attempting to satisfy consumer desires.

Furthermore, material costs have continued to escalate, causing the metal employed in the coil springs to become increasingly expensive. As a result, the mattresses, seats, and upholstery produced using coil springs have increased in price due to the substantial added expense of the metal materials.

As a result of these difficulties and drawbacks, substantial effort has been expended in attempting to achieve substitute materials and constructions for reducing and/or eliminating coil springs from mattresses, seats, upholstery, and the like. The following patents exemplify the constructions that have been developed in the prior art.

U.S. Pat. No. 6,704,962 claims the elastic body, made from foamed polyurethane or polystyrene polymer, and the mattress constructed by using such elastic body. The elastic body has circular shape of across section and it is not hollow.

U.S. Pat. No. 6,347,423 claims a string of connected and individually jacketed cushioning elements, which are in plug-like (cylinder) form. Those elements are not three-dimensionally cured and are not hollow.

U.S. Pat. No. 6,286,167 claims to use cylindrically-shaped support elements or the like laying inside the slots that are separated by sleeves for mattress core.

U.S. Pat. No. 5,836,027 claims an integrated matrix bedding system, in which cylindrical shaped glands are placed inside the holes of foam cushion.

U.S. Pat. No. 5,452,488 claims the mattress that comprise of an integrally molded sheet-like base and a plurality of discrete foam elements.

U.S. Pat. No. 4,895,352 claims bellows-like spring through blow molding process and slotted extrusion member as cushion U.S. Pat. No. 4,713,854 claims using strips of arch-like segments for cushion. The strips are arranged side by side with offset from each other.

U.S. Pat. No. 4,194,255 claims elastic springy element, which is tubular body having a plurality of hollows arranged in staggered symmetry through its tubular wall. The wall along the direction of axis of the body is not cured.

U.S. Pat. No. 3,974,532 claims using a plurality of elongated padding members disposed in parallel on a base member of mattress.

U.S. Pat. No. 2,768,924 claims a cushioning cavity layer consisting of a plurality of angularly spread apart columns and each having its upper end and lower end joined.

U.S. Pat. No. 2,539,058 claims using fibrous coil element embedded in the cylindrical cells as cushion.

As is evident from foregoing discussion and the teaching found in the above identified prior art patents, the industry has incurred a substantial effort in attempting to overcome the difficulties and drawbacks of coil metal springs. However, in spite of this substantial effort, no construction has been developed which completely eliminates the prior art problems.

Therefore, it is a principal object of the present invention to provide a load bearing, supporting, and/or cushioning element which is capable of being mass-produced in a cost-efficient manner.

Another object of the present invention is to provide a load bearing, supporting, and/or cushioning element having the characteristic features described above which is capable of being employed as a single element as well as in combination with a plurality of similarly constructed elements cooperatively associated therewith.

Another object of the present invention is to provide a load bearing, supporting, and/or cushioning element having the characteristic features described above which is formed from polymeric material in a three-dimensional, hollow shape.

Another object to the present action is to provide a load bearing, supporting, and/or cushioning element having the characteristic features described above which is capable of being quickly and easily assembled into a finished product for any desired use.

Other and more specific object will in part be obvious and will in part appear hereinafter.

SUMMARY OF THE INVENTION

By employing the present invention, all of the difficulties and drawbacks found in the prior art have been eliminated, and an easily produced, relatively inexpensive load bearing, cushioning and/or supporting element has been attained for use in a wide variety of products and industries. Exemplary uses of the present invention include mattresses, seats, upholstery, and the like as a substitute for coil metal springs, as well as cushioning materials for packages in shipping and transport of products;

In accordance with this invention, a three-dimensional, load bearing, cushioning, and/or supporting element has been developed which is employable for providing the desired load bearing, support and/or comfort to the user or product. The load bearing cushioning/supporting element of the present invention accommodates large strain under force, and shows good resiliency and repeated recovery.

The load bearing/cushioning/support element of the present invention is preferably produced by employing a continuous extrusion process with either immediate manipulation of the element following the extrusion process, or a secondary thermal forming process following the extrusion process. Alternatively, blow molding or injection molding processes can be employed to form the load bearing/cushioning/support element of the present invention.

Regardless of the process employed, the load bearing/cushioning/support element of the present invention comprises a three-dimensional, profile which can be employed either independently, in combination with a plurality of other profiles, in combination with other materials to form a hybrid construction, or in a combination of the foregoing. As an example of one specific use of the load bearing/cushioning/support element of the present invention, a plurality of elements can be employed to form the internal support structure of a mattress body.

In this regard, a plurality of load bearing/cushioning/support elements are assembled together using a wide variety of alternate manufacturing methods such as welding, gluing, mechanical joining, or assembly into a peripherally surrounding and enveloping retaining sleeve/housing. Regardless of the method employed, each of the load bearing/cushioning/supporting elements of the present invention are mounted in cooperating, side by side relationship to each other, providing an enlarged, substantially continuous surface area on which an individual is capable of lying for being fully supported by the load bearing resistance or support provided inherently in the individual elements of the present invention.

Each element manufactured in accordance with the present invention is capable of resisting or accommodating large or high levels of strain applied thereto under force. When exposed to such conditions, each element manufactured in accordance with the present invention provides good resiliency and recovery.

In the preferred construction and implementation of the present invention, each load bearing/cushioning/support element of the present invention comprises a three-dimensional, hollow structure or profile formed from the continuous extrusion of a polymeric material having either a cellular or non-cellular nature. Typically, the profile is produced with either a foam composition or a non-foam, solid composition. Furthermore, the polymeric material comprises either a synthetic polymer or a polymer made of naturally occurring components. If desired, further additives such as flame retardant materials, smoke suppressants, anti-microbials, etc. can also be incorporated into the polymer during the extrusion process to achieve particularly desired physical characteristics.

Furthermore, in the present invention, each load bearing/cushioning/support element comprises a plurality of indentations which are formed along the longitudinal axis of the three-dimensional, hollow structure or profile. In the preferred embodiment, a pair of indentations are formed directly into each opposed side of the outer surface of the three-dimensional, hollow structure or profile, with the indentations being substantially perpendicular to the central axis of the hollow structure or profile. In addition, a plurality of paired indentations are preferably formed at spaced positions along the length of the axis of the three-dimensional, hollow structure or profile.

Although this construction comprises the preferred configuration for the load bearing/supporting/cushioning element of the present invention, alternate constructions can be implemented without departing from the scope of the present invention. In this regard, the indentations formed in each hollow structure or profile need not be configured in paired relationship to each other and, alternatively, can be configured in a repeatable pattern or a non-repeatable pattern. Furthermore, the indentations can be formed in the hollow structure or profile with an angular relationship to the central axis of the hollow structure or profile. In addition, this angular relationship can be repeated along the length of the hollow structure or profile or can be altered in any desired manner.

As is evident from the foregoing detailed discussion, the load bearing/cushioning/supporting element of the present invention can be constructed in a wide variety of alternate configurations, patterns, and visual appearances. However, regardless of the particular construction employed, the load bearing/cushioning/supporting element resulting from the present invention provides the desired repeatable and predictable deformation and recovery under compressive force and release of such force. As a result, the desired inherent structural support, load resistance and comfort level are effectively attained.

Although the load bearing/cushioning/supporting element of the present invention can be formed from any desired synthetic polymer or naturally occurring polymer, it has been found that the synthetic polymer material preferably comprises one or more selected from the group consisting of polyolefins, polyurethanes, silane cross-linked polyolefins, polyvinyl chlorides, ethylene vinyl acetate copolymers, polystyrene-polyethylene copolymers, thermoplastic elastomers, and thermoplastic polyolefins. Although these compounds are preferred and have been found to provide the desired results, numerous other synthetic polymers can be employed with equal efficacy.

It has also been found that each load bearing/cushioning/supporting element of the present invention preferably comprises a density ranging between about 8 kg/m3 and 400 kg/m3, with a range of between about 16 kg/m3 and 48 kg/m3 being preferred. In addition, it is also been found that the wall thickness of each element preferably ranges from between about 1.5 and 100 mm, with a range of between about 6 mm and 50 mm being preferred. Finally, it has been found that the preferred hydraulic diameter of each element preferably ranges between about 1.5 mm and 0.6 meters, with a range of between about 50 mm and 0.3 meters being preferred.

The invention accordingly comprises an article of manufacture possessing the features, properties, and relation of elements, as well as the several steps and the relation of one or more of such steps with respect to each other which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying the drawings, in which.

DETAILED DISCLOSURE

By referring to FIGS. 1-17, along with the following detailed discussion, the preferred construction of alternate embodiments of the cushioning/supporting element of the present invention can best be understood, along with the use of the elements of the present invention in the bedding and furniture industry. In addition, alternate methods for producing the load bearing, cushioning/supporting elements of the present invention are fully disclosed. However, although this disclosure details the preferred embodiments of the present invention and the methods of production therefor, alternate constructions and methods of formation are capable of being employed without deviating from the scope of the present invention. Consequently, it is to be understood that the following detailed discussion and associated figures are provided for exemplary purposes only and are not intended as a limitation of the present invention.

Figure 1:
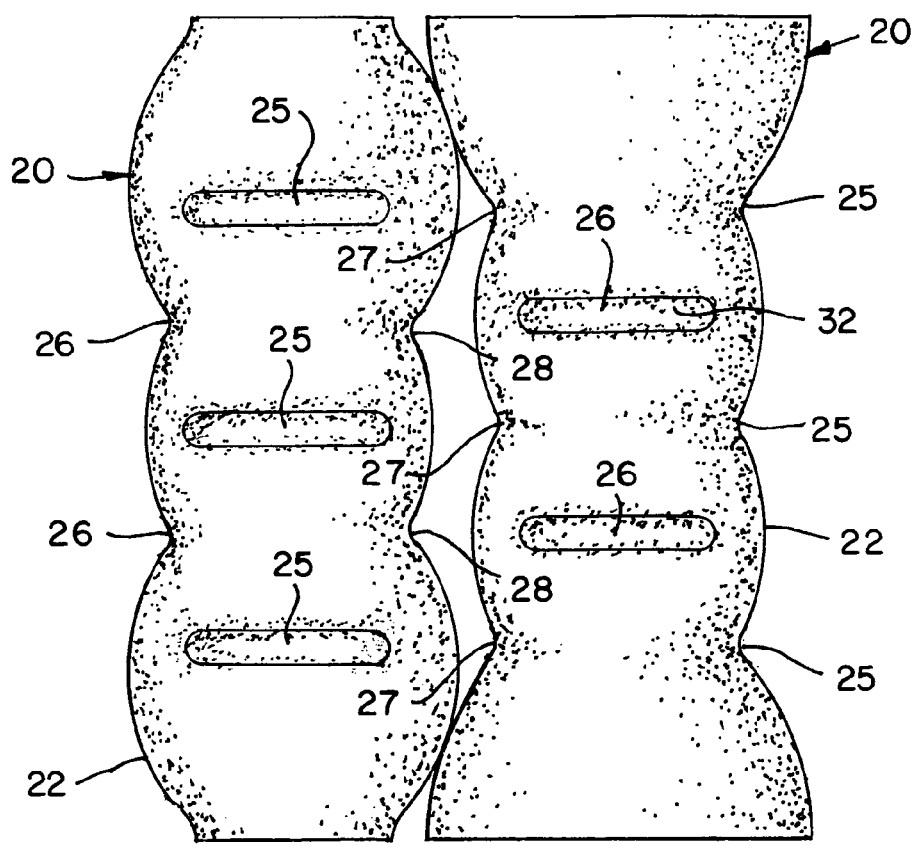
FIG. 1 is a front elevation view of two, three-dimensional, load bearing/cushioning/supporting elements of the present invention, mounted in side to side relationship and arcuately turned 90° relative to each other.
Figure 3:
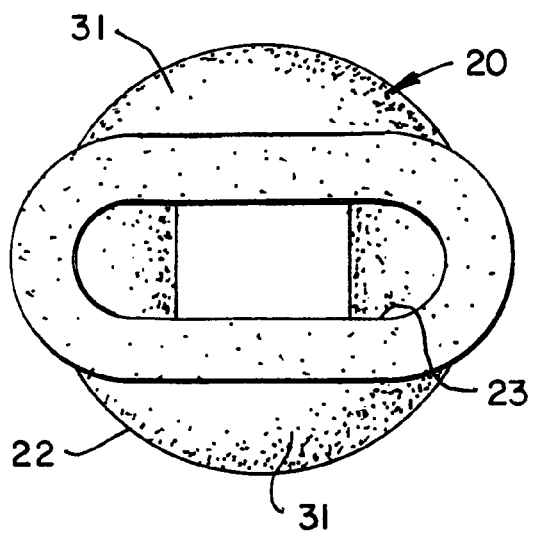
FIG. 3 is a top plan view of one three-dimensional, load bearing/cushioning/supporting element of FIG. 1.
Figure 2:
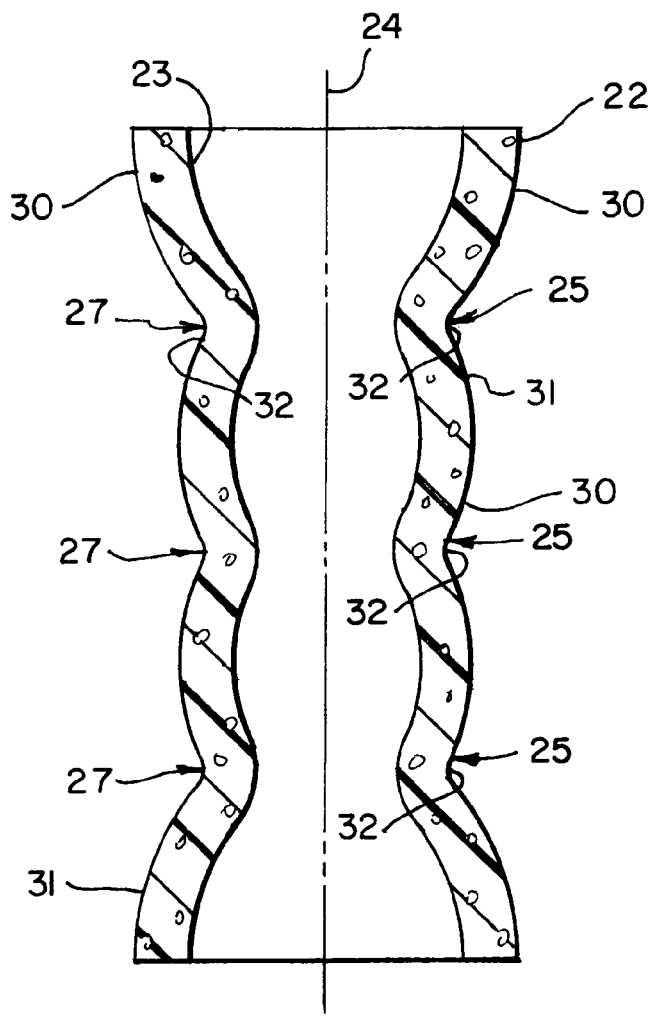
FIG. 2 is a cross-sectional side elevation view of one three-dimensional, load bearing/cushioning/supporting element of FIG. 1.

In FIGS. 1 and 2, one preferred embodiment of the three-dimensional, hollow, load bearing/cushioning/supporting element 20 of the present invention is depicted, with FIG. 1 depicting two, structurally identical profiles shown in side-to-side relationship, with each profile being 90° offset from the adjacent profile. In this way, the unique structural shape and physical appearance of each load bearing/cushioning/supporting element 20 having this preferred configuration can be fully understood.

In the embodiment depicted in FIGS. 1 and 2, each element 20 comprises an original profile formed in a generally hollow, cylindrical shape incorporating an outer surface 22, inside surface 23 and an elongated, central axis 24. In addition, element 20 in its final configuration comprises a plurality of notches or indentations 25, 26, 27, and 28 formed in outer surface 22 extending inwardly towards central axis 24. In the embodiment depicted in FIGS. 1 and 2, each indentation 25, 26, 27, and 28 is formed into outer surface 22 of element 20, comprising an inwardly extending cavity or depression having two, converging, sloping, curved side walls 30 and 31 which converge in a single elongated base 32 which extends substantially perpendicularly to the central axis of profile 21.

Furthermore, in this embodiment, indentations 25 and 26 are paired with each other by being formed on opposite sides of element 20 and positioned in substantial, horizontal alignment with each other. In addition, indentations 27 and 28 are also paired with each other by being formed on opposite sides of element 20 and positioned in substantial, horizontal alignment with each other, while also being arcuately offset from indentations 25 and 26 by about 90°. By continuously repeating this pattern along the entire length of element 20, this preferred embodiment of the load bearing/cushioning/supporting element 20 is attained.

As is more fully detailed below, load bearing/cushioning/supporting element 20 may be formed using various methods of manufacture. However, in most of the production methods, element 20 comprises a generally hollow, cylindrically shaped member as its original form or profile, with further processing steps being implemented to create indentations 25, 26, 27, and 28. As a result of these production methods, load bearing/cushioning/supporting element 20 of the present invention incorporates a substantially uniform, wall thickness throughout its length while also incorporating arcuately curved surfaces forming and defining sloping side walls 30 and 31 associated with each of the indentations 25, 26, 27, and 28. It has been found that this construction and configuration provides the desired load bearing, cushioning, and supporting properties which are inherent in element 20, and enables element 20 to accommodate large strain under force and show good resiliency and repeated recovery.

In the preferred embodiment, load bearing/cushioning/supporting element 20 is formed from a polymeric material having either a cellular or noncellular nature. Furthermore, the polymeric material comprises either a synthetic polymer or a polymer made of naturally occurring components. If desired, additives may be incorporated into the polymeric material in order to achieve certain desired properties. Typically, additives selected from the group consisting of flame retardant materials, smoke suppressants, and anti-microbial compounds are incorporated into the polymer during the formation process in order to achieve the desired physical characteristics.

Although load bearing/cushioning/supporting element 20 can be formed from any desired polymeric material, the following polymeric materials have been found to provide a final product which achieves all of the goals and attributes sought for element 20. These polymeric materials comprise one or more selected from the group consisting of polyolefins, polyurethanes, silane cross-linked polyolefins, polyvinyl chloride, ethylene vinyl acetate copolymers, polystyrene-polyethylene copolymers, thermoplastic elastomers, and thermoplastic polyolefins. Although these materials exemplify synthetic polymers which have proven to be extremely useful, this list should not be considered as limiting the present invention to these materials, since these materials are provided for exemplary purposes only.

It has also been found that each load bearing/cushioning/supporting element 20 of the present invention preferably comprises a density ranging between about 8 kg/m3 and 400 kg/m3, with a range of between about 16 kg/m3 and 48 kg/m3 being preferred. In addition, it has also been found that the wall thickness of each element 20 preferably ranges from between about 1.5 and 100 mm, with a range of between about 6 mm and 50 mm being preferred. Finally, it has also been found that the preferred hydraulic diameter of each element 20 preferably ranges between about 1.5 mm and 0.6 meters, with a range of between about 50 mm and 0.3 m being preferred.

In general, each load bearing/cushioning/supporting element 20 may be constructed with any desired overall, axially extending height, or length, which is required for a particular application. However, for most applications, it has been found that the height or length of each element 20 preferably ranges between about 12 mm and 3 meters, with a range of between about 50 mm and 0.6 meters being preferred.

Although load bearing/cushioning/supporting element 20 of FIGS. 1 and 2 is constructed from an original profile which comprises a substantially hollow, cylindrical shape, the resulting element 20 of the present invention which is produced with indentations 25, 26, 27, and 28, incorporates an oval or elliptical shape extending in a first direction, and an oval or elliptical shape which extends in a second direction with the second direction being 90° from the first direction. This construction is clearly shown in FIG. 3. Furthermore, the transition from one oval/ellipse to another oval/ellipse along the axis of element 20 is smooth and, in the preferred embodiment, is continuously repeated in a similar pattern. However, as detailed above, the pattern can be widely varied depending upon the particular construction desired.

In addition, the resulting overall configuration of the oval/elliptical shapes is controlled by the depth of formation of each indentation 25, 26, 27, and 28 into outside surface 22. In this regard, it has been found that each indentation 25, 26, 27, and 28 preferably comprises between about 5% and 50% of the overall diameter of the original profile. By employing this construction, the desired physical characteristics sought for element 20 are realized. However, any other desired indentation depth can be employed without deviating from the scope of the present invention.

It has been found than load bearing/cushioning/supporting element 20 of the present invention possesses highly desirable physical characteristics for providing both cushioning and supporting properties when subjected to a wide variety of loads. In this regard, when element 20 is subjected to a compression load, which is typically applied along the central axis thereof, the overall height of element 20 decreases while the elliptical/oval shape of the cross-sectional area is stretched. In addition, whenever element 20 is compressed, the volume of hollow space inside element 20 is reduced. As a result, air inside of the hollow space is partially discharged.

When the compression force is removed from element 20, air returns into the hollow space defined by element 20. In order to prevent any audible sounds from being generated from the movement of air during compression and decompression, apertures may be formed in the side wall of element 22 which virtually eliminates unwanted noises.

Furthermore, the actual inherent physical properties possessed by element 20 depends upon many factors, such as the polymeric material employed, the geometry of element 20, its diameter, wall thickness, curvatures, material densities, etc. In order to demonstrate the broad capabilities of element 20, reference should be made to FIGS. 4, 5, 6, and 7 wherein the results achieved from a wide variety of tests are presented. By referring to these figures, along with the following discussion, the unique attributes and capabilities of element 20 of the present invention can best be understood.

Figure 4:
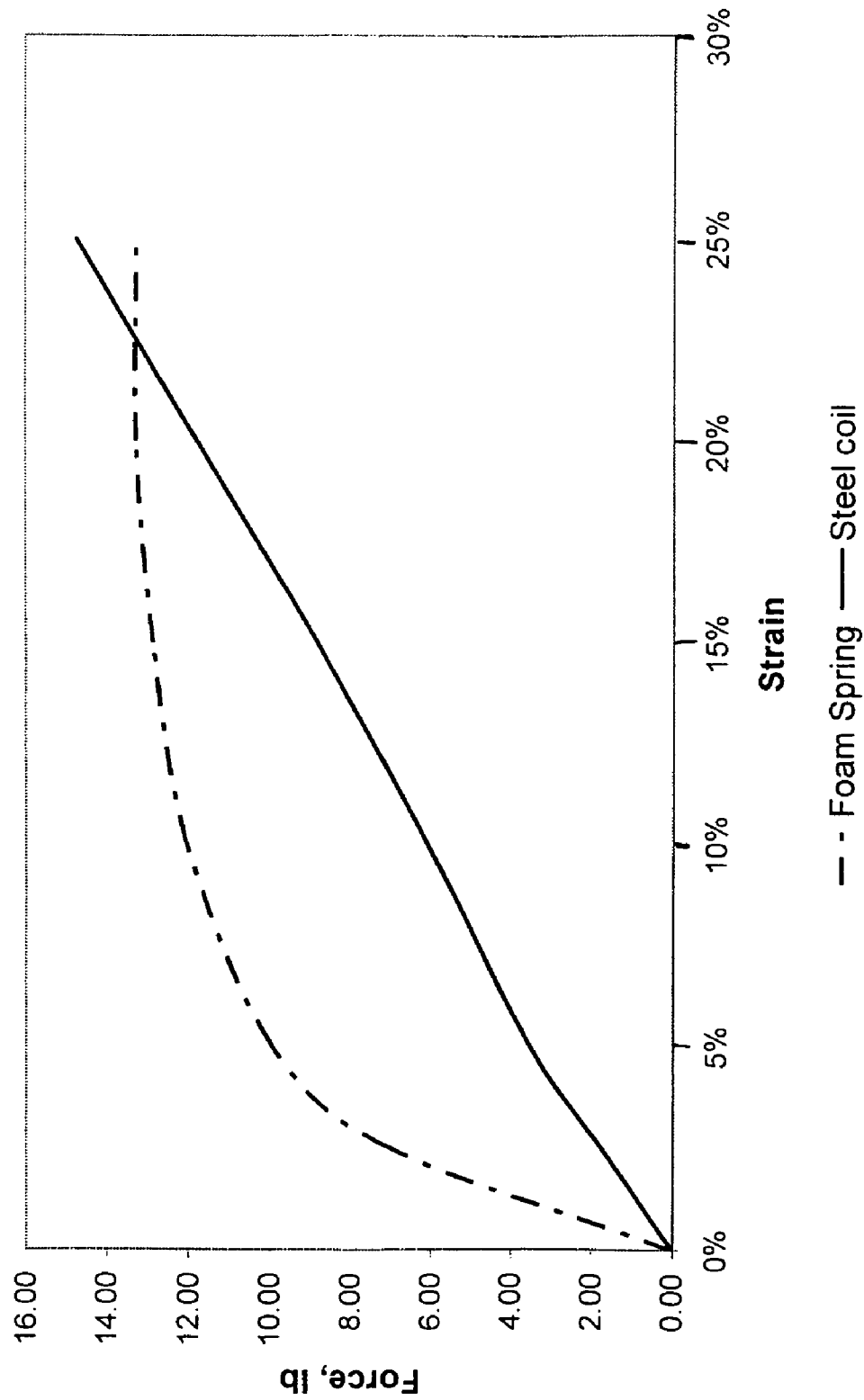
FIG. 4 is a graphical representation of a strain-stress curved of a single three-dimensional, load bearing/cushioning/supporting element of the present invention.

In FIG. 4, a stress strain curve is shown depicting the strain experienced by element 20 when exposed to various force loadings. As depicted, moderate strain or changes are experienced by element 20 in response to the imposition of forces or loads up to 10 to 12 pounds. For purposes of comparison, the stress-strain performance of a steel coil spring is also provided in FIG. 4.

Figure 5:
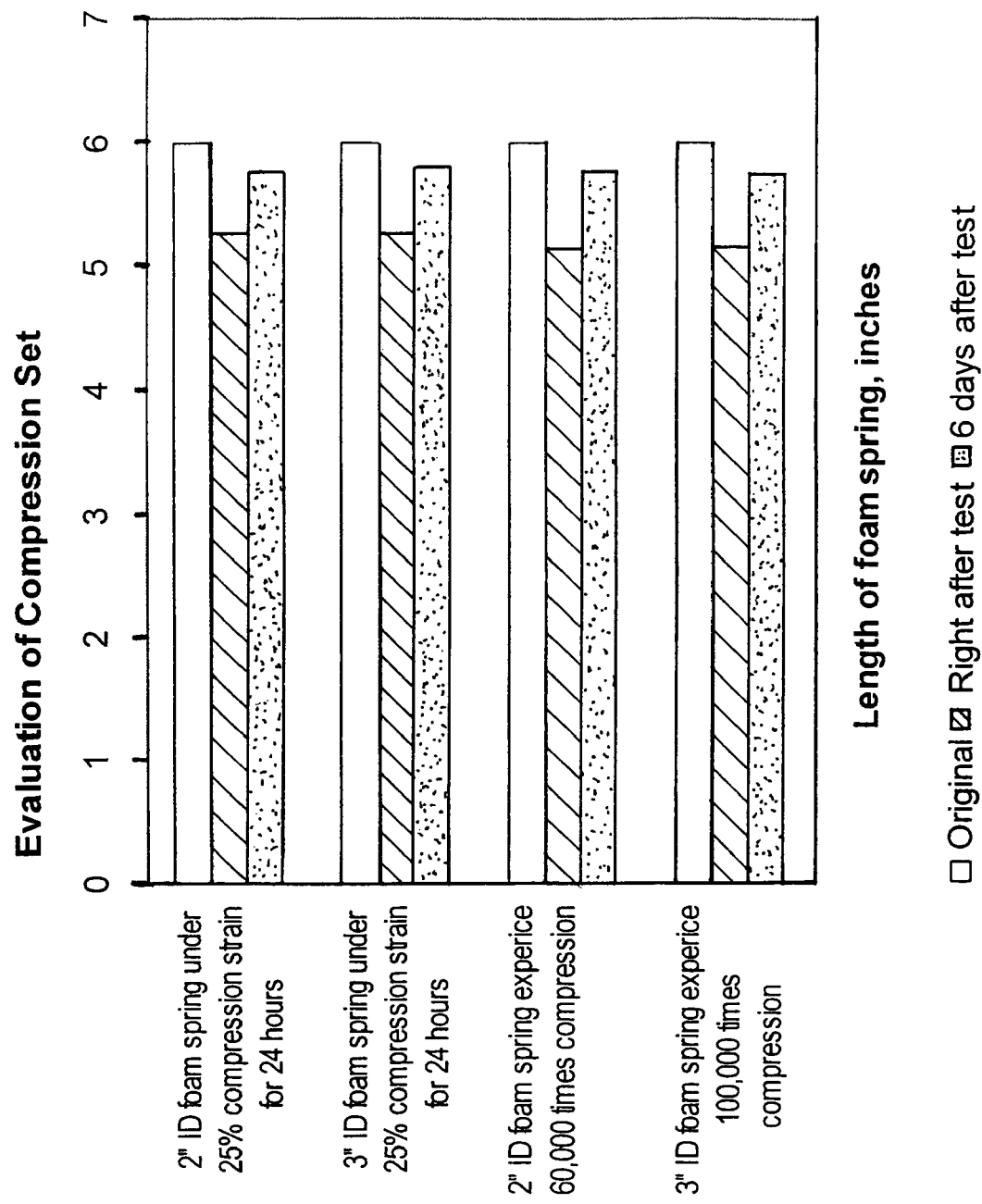
FIG. 5 is a graphical representation of the test results that were obtained from both dynamic compression and static compression of a three-dimensional, load bearing/cushioning/supporting element of the present invention.

In FIG. 5, the results from both dynamic compression and static compression on load bearing/cushioning/supporting element 20 is provided for both a 2 inch inside diameter and 3 inch inside diameter profile. In each of the tests, the static compression tests consisted of applying a 25% compression strain on each test element for 24 hours, with the dynamic compression test consisting of the application of a 25% compression strain on each test element repeatedly for 60,000 cycles. As is evident from the results provided in FIG. 5, each of the elements tested fully supported the loads being applied, experiencing only a 15% compression set during the application of the load. Furthermore, each element tested recovered to almost a full length after the removal of the loads.

Figure 6:
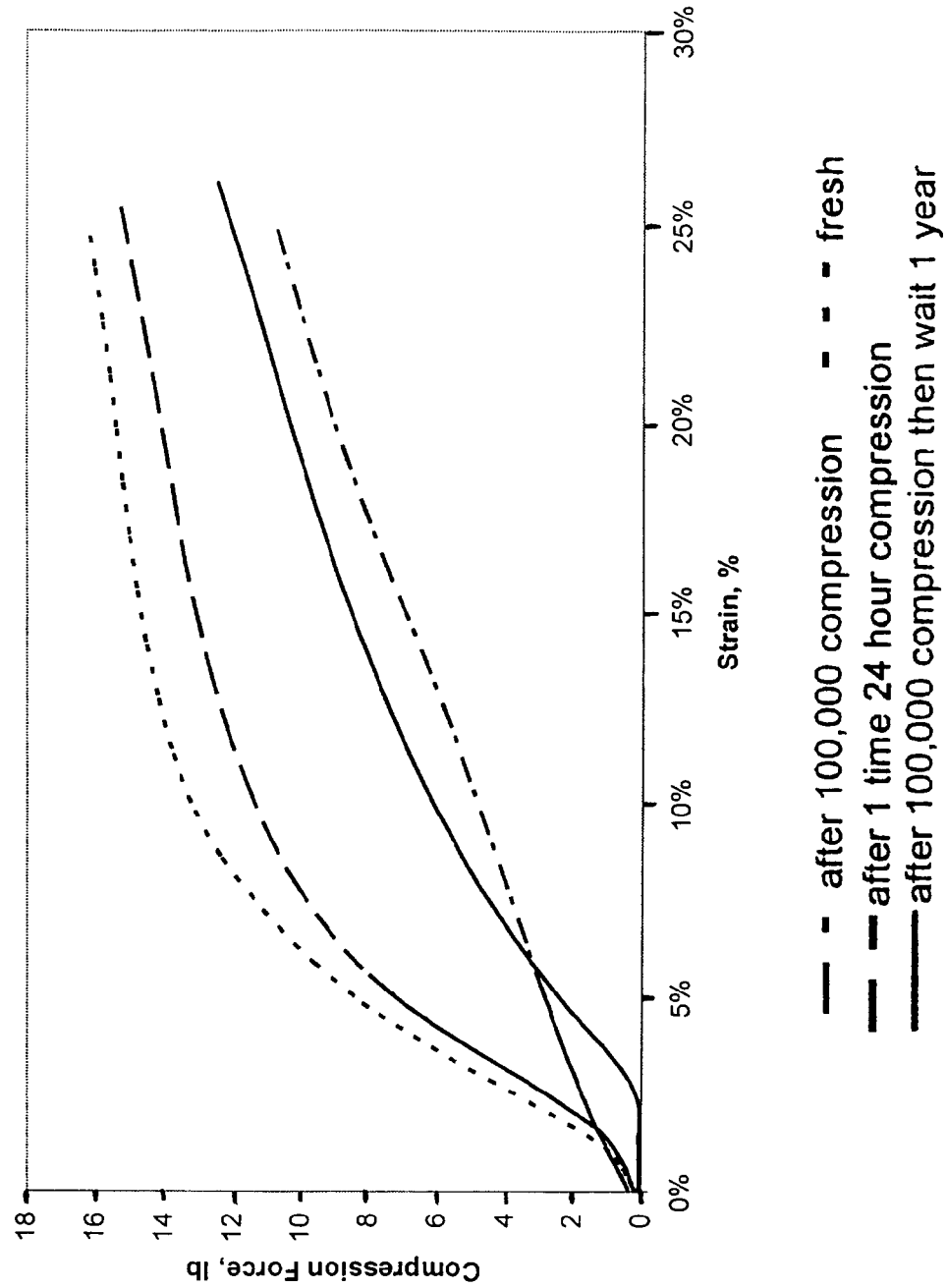
FIGS. 6 and 7 are graphical representations of stress strain results achieved on two alternate constructions for a three-dimensional, load bearing/cushioning/supporting element of the present invention.
Figure 7:
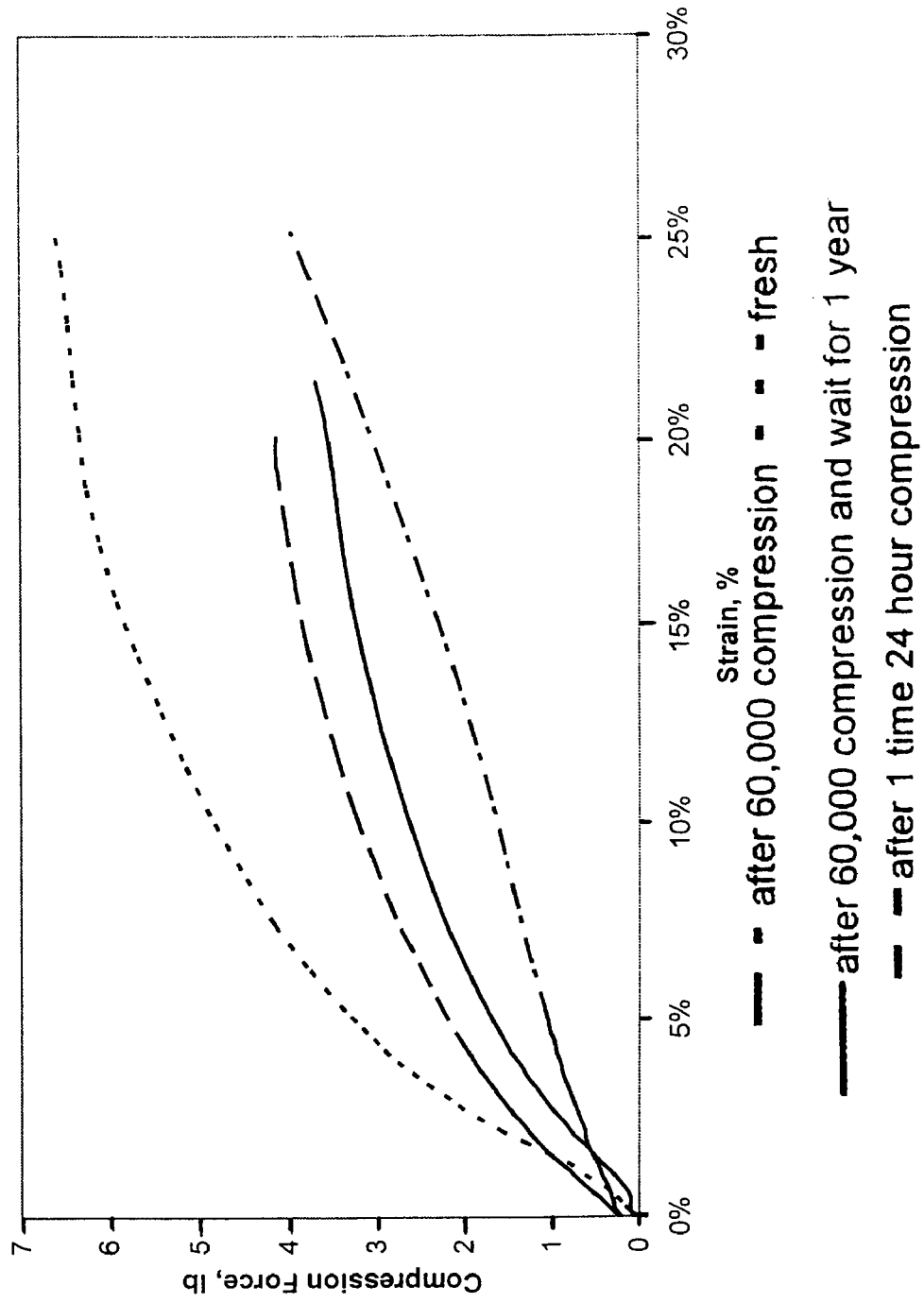

In FIG. 6, the performance results attained by testing load bearing/cushioning/supporting element 20 having an internal diameter of 3 inches and a wall thickness of ½ inch are provided for both static and dynamic compression tests, while FIG. 7 provides the performance results attained by testing load bearing/cushioning/supporting element 20 which comprises a 2 inch internal diameter and a ⅜ inch wall thickness. As is evident from a review of these test results, both configurations of load bearing/cushioning/supporting element 20 of the present invention is capable of providing highly desirable support for a widely diverse load exposure. Clearly, these test results demonstrate that load bearing/cushioning/supporting element 20 of the present invention is capable of being used in numerous applications and for a wide variety of alternate purposes due wherein their inherent physical properties and strength can be advantageously employed.

In the foregoing detailed discussion, load bearing/cushioning/supporting element 20 is constructed from an original profile which comprises a generally cylindrical shape. However, the construction of element 20 is not limited to cylindrical profiles, and hollow profiles having any desired configuration or cross-sectional shape can be employed with equal efficacy. In this regard, for exemplary purposes only, a top plan view of two alternate embodiments of load bearing/cushioning/supporting element 20 of the present invention are depicted in FIGS. 8 and 9.

Figure 8:
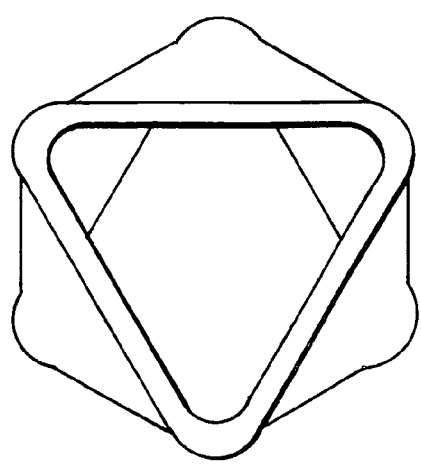
FIG. 8 is a top plan view of an alternate embodiment of a three dimensional, load bearing/cushioning/supporting element of the present invention.
Figure 9:
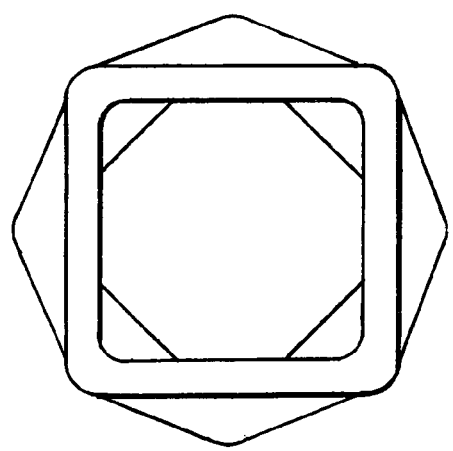
FIG. 9 is a top plan view of a further alternate embodiment of a three-dimensional, load bearing/cushioning/supporting element of the present invention.

In FIG. 8, load bearing/cushioning/supporting element 20 is formed from a profile originally comprising a hollow triangular shape, while load bearing/cushioning/supporting element 20 shown in FIG. 9 is constructed from a hollow rectangular shaped profile. Regardless of the profile configuration originally employed, each of these embodiments incorporates a plurality of indentations, as detailed above, which are formed in the side wall of each profile, for creating the resulting load bearing/cushioning/supporting element 20 depicted therein.

As discussed above, various forming processes can be employed for manufacturing load bearing/cushioning/supporting element 20 of the present invention. In the preferred production process, the original profile is constructed using a continuous extrusion process followed by the formation of the plurality of indentations into the outer surface of the hollow profile by passing the cylindrical profile through a forming machine which immediately manipulates the element into the desired final configuration. Alternatively, a secondary thermoforming process can be employed following the extrusion process. Furthermore, blow molding or injection molding processes can be employed to form load bearing/cushioning/supporting element 20 of the present invention.

In addition, the profile may be constructed using a process which produces a non-foam or solid profile. Regardless of which process is employed, the resulting profile is equally effective.

In the preferred construction process, load bearing/cushioning/supporting element 20 is produced by first forming a hollow profile having the desired cross-sectional shape by employing a continuous extrusion process, which is well known in the industry. If desired, the profile produced by the continuous extrusion machinery is fed directly into an indentation forming machine, which is exemplified by forming machine 36 shown in FIG. 10.

As depicted, indentation forming machine 36 comprises enlarged support frame 37 on which two elongated shafts 38 and 39 are horizontally mounted for rotational movement. In addition, indentation forming member 40 is mounted to shaft 38, while indentation forming member 41 is mounted to shaft 39. In the preferred construction, indentation forming members 40 and 41 each comprises a cylindrically shaped base 42 which is constructed for receiving shaft 38 or 39 and being securely affixed thereto for rotation with the rotation of shafts 38 and 39. Furthermore, a plurality of radially extending plates 43 are mounted to and extend outwardly from the outer surface of cylindrical base 42.

As shown, each plate 43 comprises a substantially flat, rectangular shape having a terminating end 44. In addition, each terminating end 44 of each plate 43 of indentation forming members 40 and 41 are constructed for being aligned with each other as forming members 40 and 41 rotate with shafts 38 and 39. Furthermore, shafts 38 and 39 are mounted to frame 37 in spaced relationship to each other, in order to assure that terminating ends 44 of indentation forming members 40 and 41 are positioned in cooperating, juxtaposed, spaced relationship to each other, defining profile receiving and feeding zone 45 therebetween.

In addition, frame 37 incorporates cooperating support arms 47 which are constructed for supportingly retaining shafts 48 and 49 in a position substantially perpendicular to shaft 38 and 39. Furthermore, indentation forming members 50 and 51 are mounted to shafts 48 and 49 and constructed for cooperating relationship with each other. Preferably, indentation forming members 50 and 51 are constructed in a manner substantially identical to indentation forming members 40 and 41, with cylindrical base 43 mounted to shafts 48 and 49 for rotation therewith, along with radially extending plates 43 mounted to the outer surface of cylindrical base 42 and extending outwardly therefrom.

Figure 10:
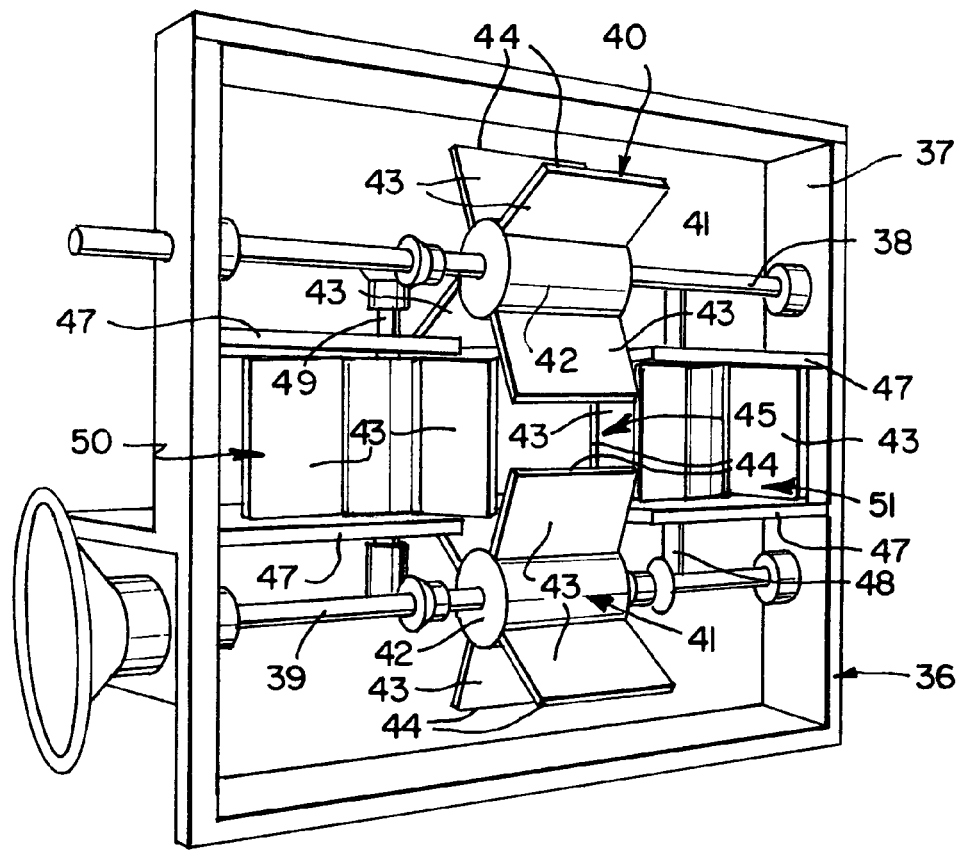
FIG. 10 is a perspective view of a forming machine employed for producing the three-dimensional, load bearing/cushioning/supporting element of the present invention.

As clearly depicted in FIG. 10, indentation forming members 50 and 51 are positioned for forming indentations in the profile which are substantially 90° from the indentations being formed by indentation forming members 40 and 41. Furthermore, indentation forming members 50 and 51 are positioned in spaced relationship to indentation forming members 40 and 41 for producing indentations in the profile which are formed at a predetermined, axially spaced distance from the indentations produced by forming members 40 and 41 in the profile. As a result, by employing indentation forming machine 36, the precisely desired configuration for load bearing/cushioning/supporting element 20 is attained.

In order to assure that the desired indentations are formed in the hollow profile at the precisely desired locations, gear members 52 are mounted to shafts 38, 39, 48 and 49 in a manner which assures the rotation of indentation forming members 40, 41, 50, and 51 in the precisely desired manner. Furthermore, each plate 43 of each indentation forming members 40, 41, 50 and 51 are pre-positioned to assure the cooperating alignment thereof as well as the spaced distance therebetween. In this way, the desired indentation construction is attained as the profile produced by the extrusion equipment is fed into feed zone 45 for axial movement through indentation forming machine 36.

By employing indentation forming machine 36, plates 43 of indentation forming members 40, 41, 50, and 51 effectively squeeze the outer surface of the profile fed therebetween in opposite directions at the desired spaced distance. Although plates 43 are depicted with terminating edges 43 which is substantially flat along their entire width, any other configuration or shape can be employed without departing from the scope of the present invention. Furthermore, plates 43 are depicted for forming indentations which extend substantially perpendicularly to the axis of element 20. However, by forming radially extending plates 43 at a slanted angle relative to base 42, the resulting indentations formed thereby can be at an arcuate angle relative to the central axis of element 20.

Figure 11:
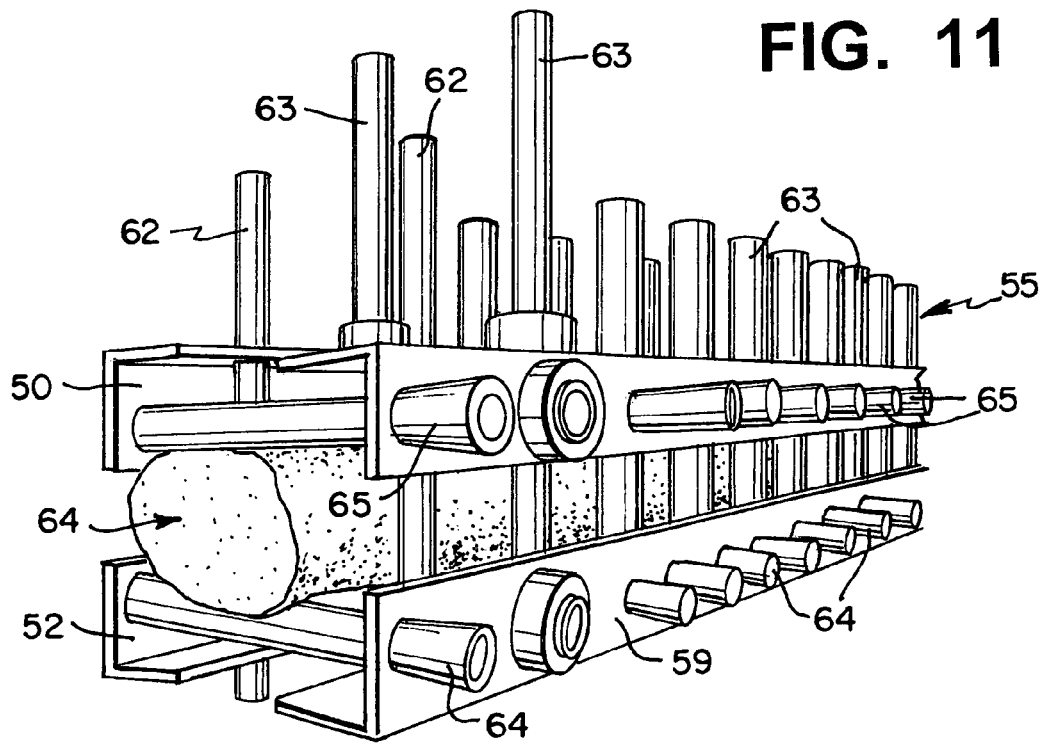
FIG. 11 is a perspective view of a thermoforming machine employed for producing the three-dimensional, load bearing/cushioning/supporting elements of the present invention.

In addition, if desired, other types of machines can be constructed to reshape the extrusion profile into a three dimensional load bearing/cushioning/supporting element 20 of the present invention. Preferably, element 20 is formed after the formation of the profile, in sufficient time to prevent the profile from becoming too cold to reshape. However, if desired, the profile can be cooled and then reformed in either an in-line or off-line thermal forming process. In FIG. 11, an effective, in-line or off-line, thermal forming construction is depicted which achieves the desired results. However, it should be understood that the thermal forming equipment depicted is provided for exemplary purposes only.

In FIG. 11, thermal forming assembly 55 comprises four elongated, longitudinally extending frame members 56, 57, 58, and 59, each of which supportingly retain horizontally extending bars 60 and 61 and vertically extending bars 62 and 63. As shown, horizontally extending bars 60 and 61 are aligned with each other to lie in a first plane, while vertically extending bars 62 and 63 are aligned with each other to lie in a second plane, with the second plane being at a spaced distance from the first plane. The longitudinally extending cavity formed between bars 60, 61, 62, and 63 defines retaining zone 64 within which the desired profile is positioned.

Once the desired profile is positioned in longitudinally extending retaining zone 64, frame members 56, 57, 58, and 59 are simultaneously advanced towards each other, causing horizontal bars 60 and 61 and vertically extending bars 62 and 63 to move towards each other, effectively squashing or squeezing the profile in both the horizontal and vertical directions simultaneously.

When the desired indentations have been effectively formed in the profile, the resulting load bearing/cushioning/supporting element 20 is removed. If required, the entire thermal forming assembly 55 can be placed in an oven or a heating tunnel, in order to assure that the profile is maintained at an elevated temperature which will enable the desired indentations to be permanently formed therein.

As is evident from the foregoing detailed discussion, load bearing/cushioning/supporting element 20 of the present invention can be constructed in a wide variety of alternate sizes, shapes, and configurations, and can be employed in a wide variety of alternate products and industries. Furthermore, in most uses and applications, each load bearing/cushioning/supporting element 20 comprises a basic building block from which any desired product is constructed. In this regard, the use of the present invention in mattress, cushion, and upholstery industries is a prime example demonstrating the highly effective use of the present invention.

Figure 12:
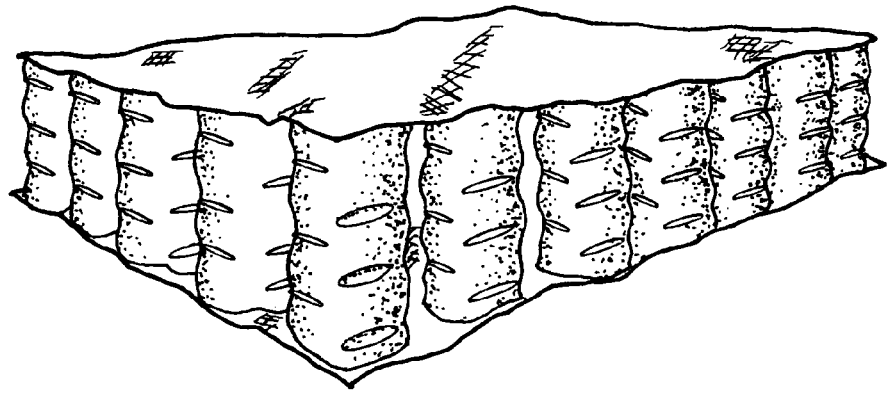
FIG. 12 is a perspective view of a mattress core constructed by employing the three-dimensional, load bearing/cushioning/supporting element of the present invention.

As shown in FIG. 12, a mattress assembly is constructed employing a plurality of load bearing/cushioning/supporting element 20 of the present invention. As shown, each load bearing/cushioning/supporting element 20 is placed in spaced relationship to an adjacent load bearing/cushioning/supporting element 20, with the vertical axis of each element 20 being aligned with each adjacent element 20.

In the embodiment depicted in FIG. 12, both opposed ends of elements 20 are mounted to a pair of nonwoven fiber sheets 68, thereby securing and maintaining elements 20 in the precisely desired aligned position. By employing this construction, the core portion of a complete mattress assembly is attained in an easily constructed manner which is capable of providing the desired compression whenever an individual would lie on the surface of the resulting mattress.

Furthermore, in the preferred construction of the mattress core depicted in FIG. 12, each load bearing/cushioning/supporting element 20 is turned 90° relative to each adjacent load bearing/cushioning/supporting element 20. As a result of this configuration, the adjacent walls of each element move in generally the same direction under compression. Due to the geometry design of elements 20, the resulting mattress is able to accommodate large strain loads in the direction of compression, without experiencing substantial expansion in the transverse directions. As detailed above, elements 20 also provide effective recovery once the compression force is removed.

Figure 13:
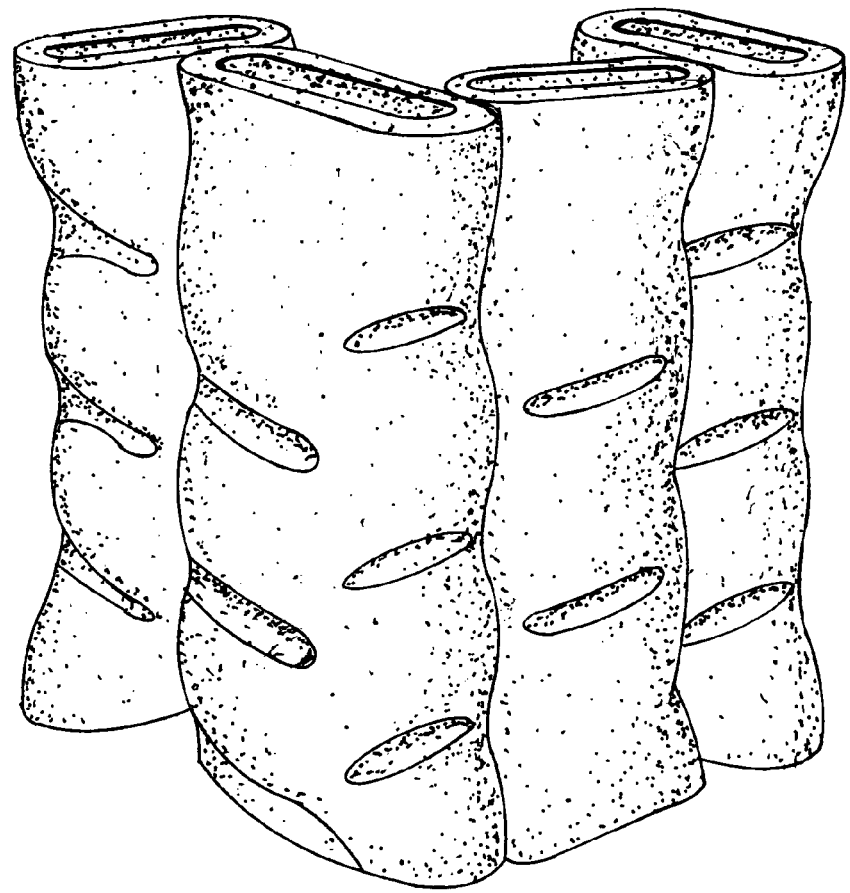
FIG. 13 is a perspective view of an alternate construction of a mattress core constructed by employing the three-dimensional, load bearing/cushioning/supporting elements of the present invention.

In FIG. 13, an alternate construction for producing the supporting section of a mattress or cushion is depicted. In this embodiment, each load bearing/cushioning/supporting element 20 is welded to each adjacent load bearing/cushioning/supporting element 20 to achieve the desired supporting core. By employing this core assembly independently or in combination with other sheets of foam or fiber material, a final product can be quickly and easily produced.

Figure 14:
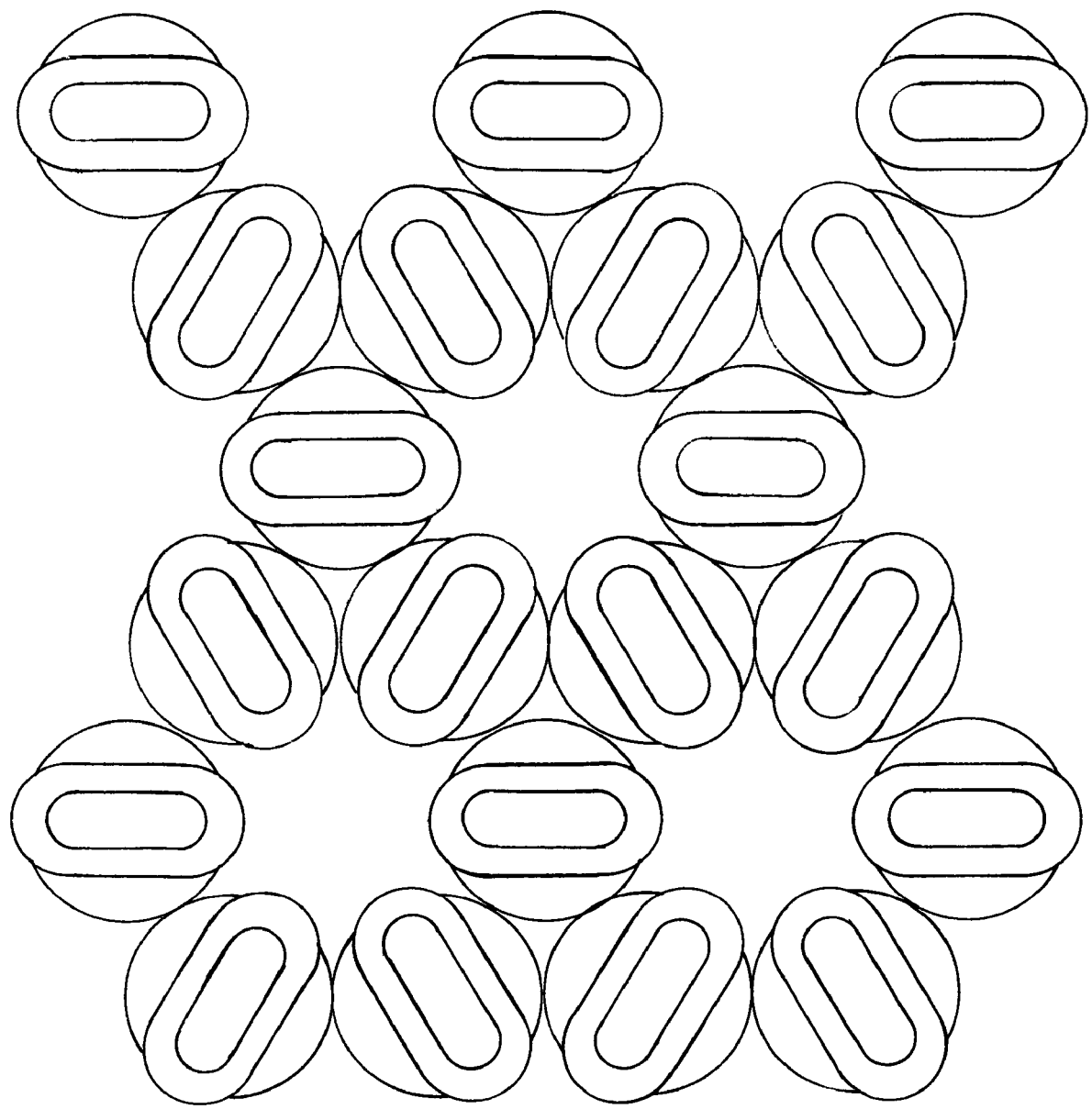
FIG. 14 is a perspective view of a further alternate construction of a mattress core constructed by employing the three-dimensional, load bearing/cushioning/supporting elements of the present invention.

In FIG. 14, a further alternate configuration in which load bearing/cushioning/supporting elements 20 of the present invention can be configured is clearly depicted. In this embodiment, each load bearing/cushioning/supporting elements 20 is bonded or welded to each adjacent load bearing/cushioning/supporting element 20 in a manner which produces a honeycomb structure, as shown in FIG. 14. By employing this configuration, unique supporting capabilities and performance results are realized.

Figure 15:
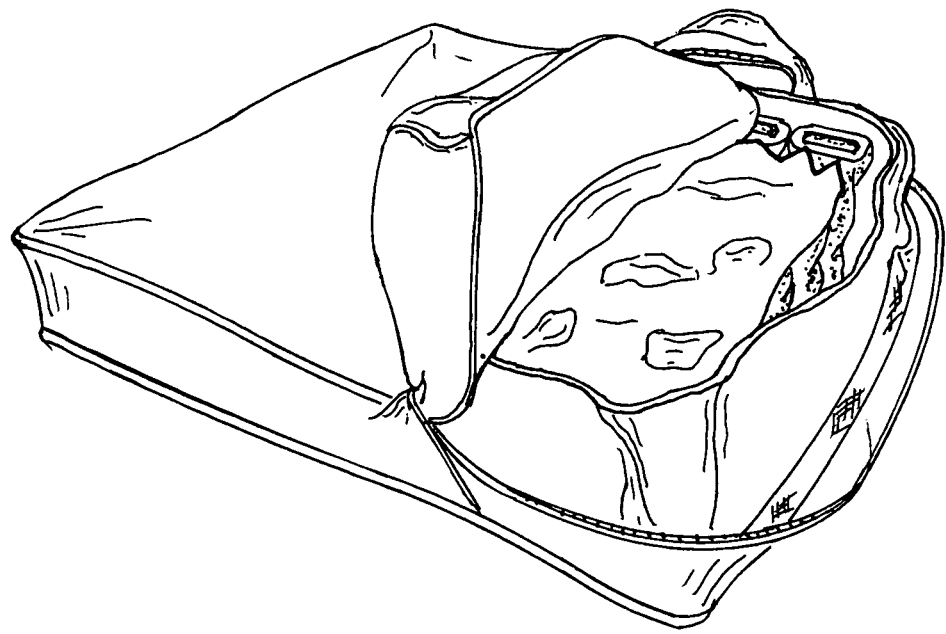
FIG. 15 is a perspective view of a marine seat constructed by employing the three-dimensional, load bearing/cushioning/supporting elements of the present invention.
Figure 16:
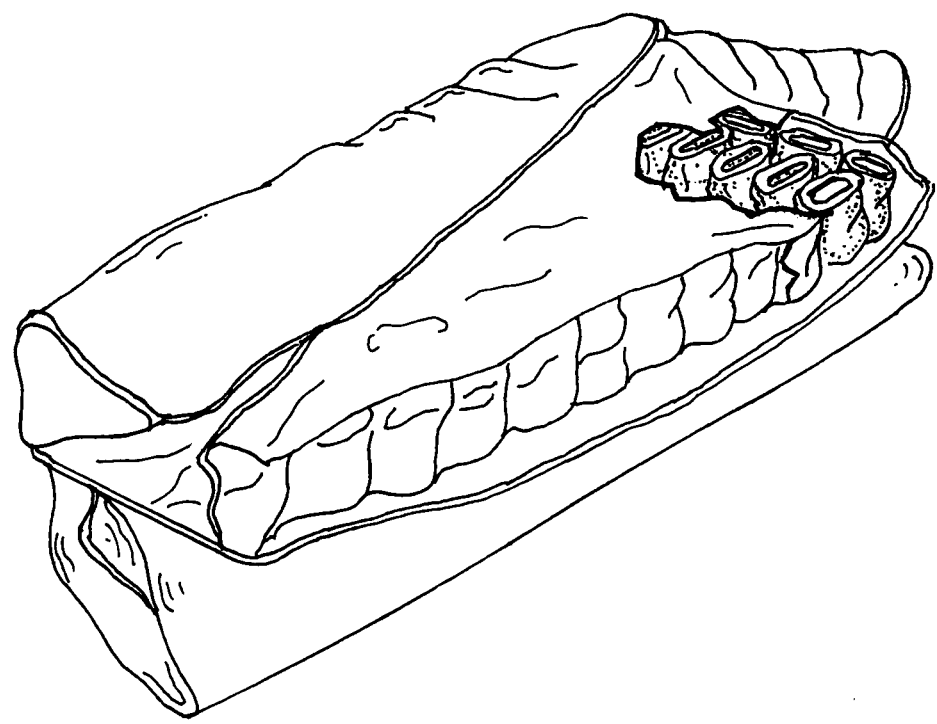
FIG. 16 is a perspective view of a marine back support constructed by employing the three-dimensional, load bearing/cushioning/supporting elements of the present invention.

As a further example of the manner in which the present invention can be employed, FIGS. 15 and 16 clearly depict load bearing/cushioning/supporting elements 20 of the present invention employed as the supporting core for seats and back supports employed in the marine industry. Due to the unique qualities provided by the polymer materials employed in forming load bearing/cushioning/supporting elements 20, the use of elements 20 for constructing marine cushions and marine back supports represent an area in which the inherent benefits of the present invention are effectively employed. However, this area is merely exemplary of numerous other areas in which the present invention can be employed with equal efficacy.

Figure 17:
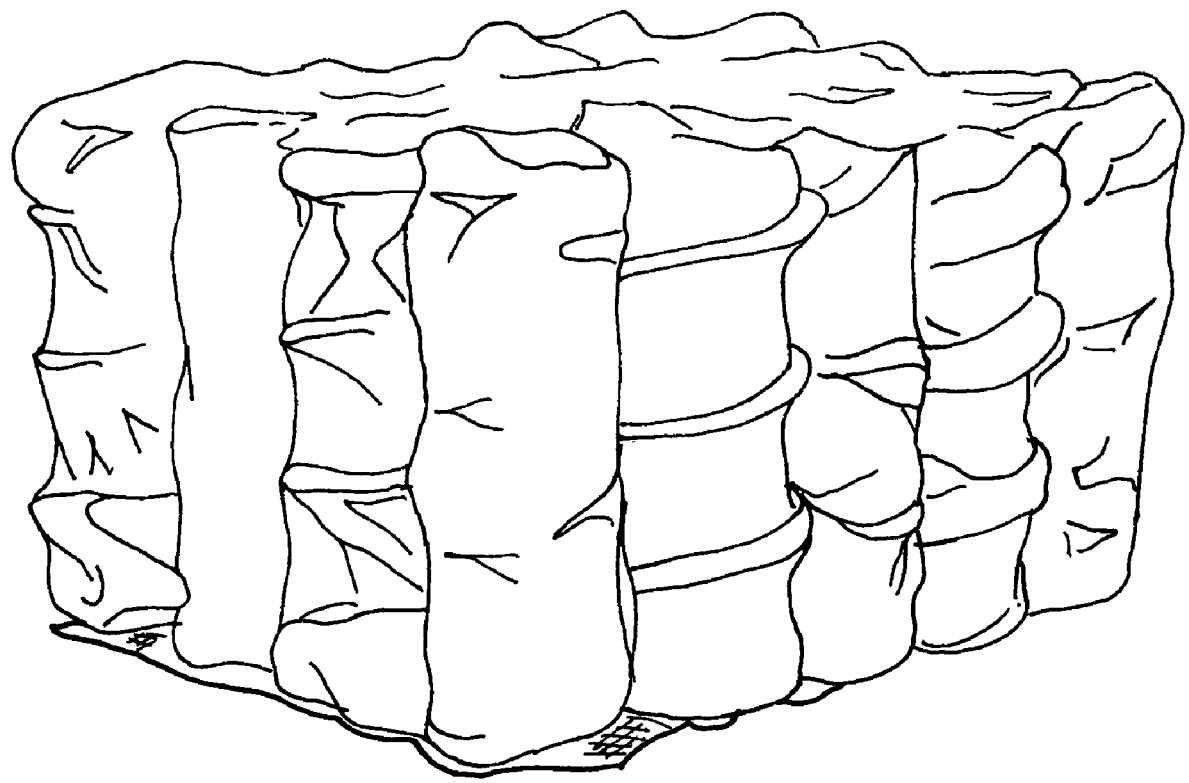
FIG. 17 is a perspective view of a hybrid cushion constructed by combining conventional spring coils with the three-dimensional, load bearing/cushioning/supporting elements of the present invention.

Finally, in FIG. 17, a cushion construction is depicted wherein the three-dimensional, load bearing/cushioning/supporting elements 20 of the present invention are employed in combination with conventional spring coils 70 for producing a hybrid cushion construction. In the cushion assembly depicted, each spring coil 70 and load bearing/cushioning/support element 20 are retained in separate, cylindrically shaped sleeves or pockets, and positioned in juxtaposed, cooperating side to side relationship with each other. In addition, in the preferred construction, the terminating end of each element 20 and coil spring 70 are affixed to a woven or nonwoven fiber sheet.

It will thus be seen that the objects set forth above, among those made apparent from the preceding description, are efficiently attained and, since certain changes may be made in carrying out the above process as well as in the article set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

Having described our invention, what we claim as new and desire to secure by Letters Patent is:

1. A support system for mattresses, cushions, upholstery, and seat backs comprising:

A. a plurality of separate and independent load bearing, cushioning, and supporting elements each comprising:
   a. a hollow profile defined by an outer surface, an inner surface, and a central passageway longitudinally extending therethrough with each of said hollow profiles comprising a substantially smooth, continuous, outer surface and a substantially smooth continuous inner surface, and
   b. a plurality of indentations formed in the outer surface of the profile and extending inwardly toward the central axis thereof, said plurality of indentations being formed about the outer surface of the profile while being spaced from the inner surface, and being in sufficient quantity and position to impart repeatable and predictable deformation and recovery to the profile in response to the application of a compressive force and the release of said force;
B. said plurality of separate and independent load bearing, cushioning, and supporting elements being positioned in juxtaposed, spaced, adjacent parallel relationship to each other with the longitudinally extending central passageway of each element being aligned to be substantially parallel to each other element; and
C. said plurality of separate and independent load bearing, cushioning, and supporting elements being cooperatively associated with each other for supporting loads placed thereon which exert a compressive force thereto, with the loads being applied substantially coaxially to the central axis of each element for causing the entire length of each hollow profile to be longitudinally compressed in a manner which causes the plurality of indentations formed on each of said load bearing, cushioning, and supporting elements to be deformed in the predictable and repeatable manner;

whereby a support system is achieved which is capable of providing cushioning, shock absorbing, and load bearing capabilities.

2. The support system defined in claim 1, wherein each load bearing/cushioning/supporting element is formed from polymeric material.

3. The support system defined in claim 2, wherein each load bearing/cushioning/supporting element is formed from one selected from the group consisting of synthetic polymer materials and polymers made of naturally occurring components.

4. The support system defined in claim 3, wherein each load bearing/cushioning/supporting element is further defined as being formed by continuous extrusion of one selected from the group consisting of cellular polymers, non-cellular polymers, synthetic polymers, and polymers made of naturally occurring components.

5. The support system defined in claim 4, wherein each load bearing/cushioning/supporting element further comprises one or more additives selected from the group consisting of flame retardant, smoke suppressants, and anti-microbial materials.

6. The support system defined in claim 2, wherein the plurality of indentations formed in the outer surface of the profile of each load bearing/cushioning/supporting element are further defined as being arranged in a pattern selected from the group consisting of repeatable and predictable patterns and random and irregular patterns.

7. The support system defined in claim 6 wherein, a first pair of indentations are formed in the outer surface of the profile of each load bearing/cushion-ing/supporting element diametrically opposed from each other and a second pair of indentations are formed in the outer surface of the profile diametrically opposed from each other, axially spaced away from the first pair of indentations and positioned substantially 90° from said first pair of indentations.

8. The load bearing/cushioning/supporting element defined in claim 7, wherein said pattern of indentations is continuously repeated along the entire length of the profile.

9. The load bearing/cushioning/supporting element defined in claim 6, wherein each of said indentations comprises a pair of slanted, sloping sidewalls converging towards each other and terminating at a single, elongated, base.

10. The load bearing/cushioning/supporting element defined in claim 9, wherein each of said indentations is further defined as extending inwardly from the outer surface of the profile a distance ranging between about 5% and 50% of the diameter of said profile.

11. The support system defined in claim 2, wherein the load bearing/cushioning/supporting element is further defined as comprising a hollow profile having an original form consisting of an elongated, continuous member having a cross-sectional shape selected from the group consisting of circles, rectangles, triangles, and polygons.

12. The support system defined in claim 2, wherein the load bearing/cushioning/supporting element is further defined as comprising a hollow profile originally configured as an elongated cylindrical member.

13. The support system defined in claim 12, wherein the plurality of indentations formed in the elongated cylindrical member of each load bearing/cushioning/supporting element produces a load bearing/cushioning/supporting element having a plurality of three dimensionally curved outer surfaces.

14. The support system defined in claim 2, wherein the load bearing/cushioning/supporting element comprises a density ranging between about 8 kg/m3 and 400 kg/m3.

15. The support system defined in claim 2, wherein the load bearing/cushioning/supporting element comprises a wall thickness ranging between about 1.5 mm and 100 mm.

16. The support system defined in claim 2, wherein the load bearing/cushioning/supporting element comprises an overall height ranging between about 12 mm and 3 meters.

17. The support system defined in claim 2, wherein the load bearing/cushioning/supporting element comprises an hydraulic diameter ranging between about 1.5 mm and 0.6 meters.

18. The support system defined in claim 2, wherein the load bearing/cushioning/supporting element is formed by the continuous extrusion of said profile followed by the immediate manipulation of the profile to impart the plurality of indentations thereto.

19. The load bearing/cushioning/supporting element defined in claim 18, wherein said manipulation of the profile occurs prior to any cooling of the profile after the extrusion thereto.

20. The load bearing/cushioning/supporting element defined in claim 18, wherein said profile is cooled and heated during the manipulation process in order to reshape the resulting profile.

21. The support system defined in claim 2, wherein the load bearing/cushioning/supporting element is formed by extrusion of said profile followed by a thermal forming process.

22. The support system defined in claim 2, wherein the load bearing/cushioning/supporting element is produced by employing a blow molding process.

23. The support system defined in claim 2, wherein the load bearing/cushioning/supporting element is produced by employing an injection molding process.

24. The support system defined in claim 1, wherein said system is employed as the core of one selected from the group consisting of mattresses, cushions, upholstery, and seat backs.

25. The support system defined in claim 1, wherein the plurality of load bearing/cushioning/supporting elements are constructed using one of the methods selected from the group consisting of spaced positioning, and side to side direct connection by welding, gluing, and mechanical joining.

26. The support system defined in claim 1, wherein the load bearing/cushioning/supporting elements are positioned between enlarged sheets of material placed on the opposed ends thereof for securely maintaining the elements in the desired side to side relationship.

27. The support system defined in claim 1, wherein the load bearing/cushioning/supporting elements are further defined as being positioned in peripherally surrounding pockets of material.

28. A support system for mattresses, cushions, upholstery, and seat backs comprising:
   A. a plurality of separate and independent load bearing, cushioning, and supporting elements each comprising:
      a. a hollow profile defined by an outer surface, an inner surface, and a central passageway longitudinally extending therethrough with each of said hollow profiles comprising a substantially smooth, continuous, outer surface and a substantially smooth continuous inner surface, and
      b. a plurality of indentations formed in the outer surface of the profile and extending inwardly toward the central axis thereof, said plurality of indentations
         1. being formed about the outer surface of the profile while being spaced from the inner surface, and being in sufficient quantity and position to impart repeatable and predictable deformation and recovery to the profile in response to the application of a compressive force and the release of said force,
         2. comprising a first pair of indentations formed in the outer surface of the profile diametrically opposed from each other and a second pair of indentations are formed in the outer surface of the profile diametrically opposed from each other, axially spaced away from the first pair of indentations and positioned substantially 90° from said first pair of indentations, and
         3. comprising a pair of slanted, sloping sidewalls converging towards each other and terminating at a single, elongated, base formed entirely in the outer surface;
   B. said plurality of separate and independent load bearing, cushioning, and supporting elements being positioned in juxtaposed, spaced, adjacent parallel relationship to each other with the longitudinally extending central passageway of each element being aligned to be substantially parallel to each other element; and
   C. said plurality of separate and independent load bearing, cushioning, and supporting elements being cooperatively associated with each other for supporting loads placed thereon which exert a compressive force thereto, with the loads being applied substantially coaxially to the central axis of each element for causing the entire length of each hollow profile to be longitudinally compressed in a manner which causes the plurality of indentations formed on each of said load bearing, cushioning, and supporting elements to be deformed in the predictable and repeatable manner;

whereby a support system is achieved which is capable of providing cushioning, shock absorbing, and load bearing capabilities.

29. The support system defined in claim 28, wherein each of said indentations of said load bearing, cushioning and support elements is further defined as extending inwardly from the outer surface of the profile a distance ranging between about 5% and 50% of the diameter of said profile.

* * * * *